United States Patent
Maier

(10) Patent No.: US 10,029,950 B2
(45) Date of Patent: Jul. 24, 2018

(54) MORTAR MIXTURE FOR THERMAL INSULATION AND/OR AS FIRE PROTECTION AND FOR UNIVERSAL APPLICATIONS, AND METHODS FOR THE PRODUCTION AND USE THEREOF

(71) Applicant: ADT AERO DÄMM TECHNIK GMBH, Müllheim (DE)

(72) Inventor: Martin Maier, Hartheim-Bremgarten (DE)

(73) Assignee: ADT Aero Dämm Technik GmbH, Müllheim (DE)

( * ) Notice: Subject to any disclaimer, the term of this patent is extended or adjusted under 35 U.S.C. 154(b) by 222 days.

(21) Appl. No.: 15/026,187

(22) PCT Filed: Oct. 10, 2014

(86) PCT No.: PCT/IB2014/065203
§ 371 (c)(1),
(2) Date: Mar. 30, 2016

(87) PCT Pub. No.: WO2015/056139
PCT Pub. Date: Apr. 23, 2015

(65) Prior Publication Data
US 2016/0244375 A1    Aug. 25, 2016

(30) Foreign Application Priority Data

| | | |
|---|---|---|
| Oct. 14, 2013 | (CH) | 01752/13 |
| Apr. 24, 2014 | (CH) | 00622/14 |
| Jul. 11, 2014 | (CH) | 01058/14 |

(51) Int. Cl.
*C04B 7/00* (2006.01)
*C04B 38/08* (2006.01)
(Continued)

(52) U.S. Cl.
CPC .............. *C04B 38/08* (2013.01); *C04B 26/02* (2013.01); *C04B 28/02* (2013.01); *C04B 28/04* (2013.01);
(Continued)

(58) Field of Classification Search
USPC ........................................ 106/675, 638, 672
See application file for complete search history.

(56) References Cited

U.S. PATENT DOCUMENTS

| | | |
|---|---|---|
| 3,617,321 A | 11/1971 | Kent |
| 4,086,098 A | 4/1978 | Le Ruyet et al. |

(Continued)

FOREIGN PATENT DOCUMENTS

| | | |
|---|---|---|
| CN | 101684671 A | 3/2010 |
| CN | 102173680 A | 9/2011 |

(Continued)

*Primary Examiner* — James E McDonough
(74) *Attorney, Agent, or Firm* — Edwin D. Schindler

(57) ABSTRACT

A mortar mixture for horizontal surfaces or as casting mortar in molds has at least 20% of the mortar mixture by volume being balls composed of expanded silica sand or expanded perlite with the balls being glazed and closed at the surface thereof and filled with air. The expanded perlite balls are mixed with binding agents, additives as binders, an air-void forming agent, chemical admixtures as liquefiers, quick-setting binders, or a combination thereof, and composed of polymers. The method for producing the mortar mixture is performed by sorting perlite sand into various grain sizes by a grading curve. Each individual grain size is then expanded in a trickling channel having multi-stage temperature zones so that the surface of the balls is glazed. The glazed, expanded perlite so produced are mixed together into a homogenous mixture by adding binding agents and cellulose, air-void forming agent, chemical admixtures or a combination thereof.

9 Claims, 1 Drawing Sheet

Figure 1:
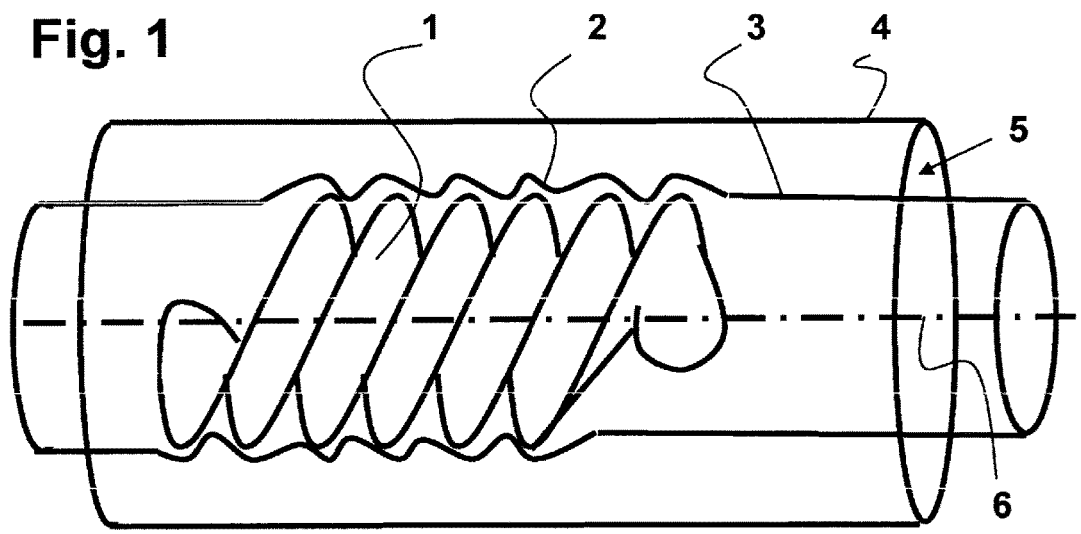

(51) Int. Cl.
*C04B 26/02* (2006.01)
*C04B 28/02* (2006.01)
*C04B 28/04* (2006.01)
*C04B 38/02* (2006.01)
C04B 20/00 (2006.01)
C04B 28/00 (2006.01)
C04B 38/00 (2006.01)
C04B 111/00 (2006.01)

(52) U.S. Cl.
CPC ..... *C04B 38/02* (2013.01); *C04B 2111/00146* (2013.01); *C04B 2111/00155* (2013.01); *C04B 2111/00517* (2013.01); *C04B 2201/20* (2013.01); *C04B 2201/30* (2013.01); *Y02W 30/97* (2015.05)

(56) References Cited

U.S. PATENT DOCUMENTS

| | | | |
|---|---|---|---|
| 5,114,617 A | 5/1992 | Smetana et al. | |
| 5,294,255 A | 3/1994 | Smetana et al. | |
| 6,103,003 A | 8/2000 | Ledbetter | |
| 2003/0055147 A1* | 3/2003 | Lelli | C08K 3/34 524/442 |

FOREIGN PATENT DOCUMENTS

| | | | |
|---|---|---|---|
| CN | 103896528 A | * | 7/2014 |
| DE | 16 71 159 | | 11/1953 |
| DE | 2341684 A1 | | 2/1974 |
| DE | 195 40 273 A1 | | 4/1997 |
| DE | 296 24 407 U1 | | 4/2003 |
| DE | 10 2005 040 091 A1 | | 3/2007 |
| DE | 20 2004 021 414 U1 | | 12/2007 |
| DE | 10 2010 044 466 A1 | | 3/2012 |
| DE | 10 2010 047 673 A1 | | 4/2012 |
| EP | 0990628 A1 | | 4/2000 |
| EP | 1593659 A1 | | 11/2005 |
| FR | 1547991 A | | 7/1969 |
| FR | 2809019 A1 | | 11/2001 |
| WO | WO 2012/007057 A1 | | 1/2012 |

* cited by examiner

MORTAR MIXTURE FOR THERMAL INSULATION AND/OR AS FIRE PROTECTION AND FOR UNIVERSAL APPLICATIONS, AND METHODS FOR THE PRODUCTION AND USE THEREOF

BACKGROUND OF THE INVENTION

Technical Field of the Invention

The present invention relates to a special mortar mixture, which can be on the one hand employed as a finishing plaster on buildings, and in another variant as an insulating plaster that can be used for interior and exterior insulation of building structures. Further, this mortar mixture can be also used for protection from fire in the form of a lower or upper coat, but also to create a screed or floor finishes, such as in leveling mortar and repair mortar for horizontal applications. Finally, this mortar mixture can be also employed as casting mortar for a mold form, or in order to manufacture insulating plates for protection from fire or for general construction purposes. The invention also relates to a method for manufacturing this mortar mixture, as well as to its use, and finally to a construction wherein the exterior and interior walls are coated with it, or the screed floor is manufactured from it, or wherein the mortar mixture is built into fire protection insulation boards, or for other construction components manufactured from this mortar mixture.

An essential fact about this mortar mixture is that it is partially or fully made from very special lightweight materials instead of from traditional sands. It can be used in a building construction in which exterior or interior walls or the ceilings or the floor boards are newly manufactured in this manner or later restored.

Description of the Prior Art

Various lightweight materials are used today in new constructions as well as for refurbishing purposes, such as expanded clay, open-cell perlite, glass beads, Polystyrene (EPS) and other materials. These lightweight materials have various disadvantages:

Open-cell perlites have a deep compressive strength of <0.2 $Nmm^2$ and they are highly water-absorbent.

Glass beads are very abrasive and their handling is therefore problematic, for example when they are used for mixing or pumping. In addition, the products are very expensive.

EPS (Polystyrene) is vapor-proof and it is not heat-resistant. In case of fire, EPS increases the heat due to its energy output. Moreover, EPS must be disposed of as hazardous waste.

The development of efficient lightweight materials with a good insulation value and with a high fire-resistance value, which additionally also produce a please room climate because only very little water is absorbed, while the materials are permeable to water vapor and have a purely mineral character and thus are naturally also degradable, represents a major challenge. Lightweight construction materials are currently mixed on the EPS base with the plaster. However, EPS is not fire-resistant. Rockwool or specialty products made from expanded clay or from expanded mica are used as fire prevention measures. However, rockwool cannot withstand compressive load. Fire-resistant boards that are made from expanded clay or expanded mica are very expensive. The reference value for insulation is the heat transmittance and this value is expressed as the lambda value (λ). The lower the value, the better is the resulting thermal insulation. Mortar or boards made from EPS have a λ value of 35 mW/mK, rockwool has a lambda value of 50-70 mW/Mk. For aerogel plasters are listed lambda values of 12-15 mW/mk. Such low lambda values for aerogel are, however, pure laboratory values. In practice, the lambda value in the mortar mixture will be increased after a mixing and pumping operation on the construction site because aerogel is mechanical stressed by the mixing and pumping operation. The same is true about mixing of mortar containing EPS beads or traditional open cell perlite, which withstands a compressive stress at 10% compression of <0.2 $N/mm^2$. Mortar mixture from similar lightweight materials having a high pressure resistance also may not be used in floor areas in which a certain pressure resistance is always required. Other lightweight materials, such as glass are very expensive and in addition, they are exposed to a very high wear in the mixer, in the pump and in transport hoses and are therefore for this reason used only to a limited extend in the construction industry.

Old buildings and their refurbishment represent another specific issue. Although old buildings are often very pretty—and sometime these are genuine monuments—they usually contain a poorly insulating building envelope and they are generally difficult to insulate at a later point. The development of efficient insulating systems, such as a well insulating plaster or well insulating boards, is therefore a challenge also for this application. Due to fire safety reasons, insulation boards made from extruded polystyrene (EPS) or Styrofoam should be additionally also protected from the effect of heat.

In Switzerland, as an example, there are about 1.5 million old buildings. One has to live with this building stock because we often want to preserve these buildings. At the same time, however, the consumption of energy in the country increases. 4.5 million tons of light oil and 3 million cubic meters of natural gas are according to the Swiss Federal Office imported every year for energy, 43 percent of which are burned to heat buildings. In order to handle these energy resources in a more economical manner, there is no solution that would make it possible to avoid the issue of better insulation of these old houses. The same is true also about many other countries.

But how does one insulate an old, historical building—whether it is a timber house, a house from the art deco era, or an old burgher's house? Protection of cultural heritage does not allow for simply wrapping up historic facades in modern insulation.

In order to preserve the appearance of the wall of an old house, plaster works best. Even the lining of winding staircases, arches and retaining walls with traditional insulation boards may sometime be costly. Plaster boarding using insulating plaster can be very easily attached in narrow areas. Moreover, the plaster is located directly on the masonry and it does not have any gaps in which moisture can condense. In practice, a combination of insulation boards and insulating plasters is often employed. Large, flat surfaces are covered with insulation boards, while winding areas of the structure are provided with insulating plaster. Lightweight mortars are essentially suitable for the repro-filing or for leveling of horizontal surfaces in old as well as in new constructions. This makes is possible decrease the weight. These leveling mortars can be also used for self-leveling. It is important in this case that these mortars absorb only a small amount of water. Under these circumstances, the water requirement is low and, accordingly, the setting time is short, which speeds up the construction programs.

Therefore, the room climate is optimal if the mortars which are applied to the floors or walls are permeable to vapor. Otherwise, there is the risk that mold could form in case of insufficient ventilation.

Aerogel is one of the best, if not the best, insulation material that can be produced on an industrial scale. The material, which is also known as "frozen smoke" due to its appearance, is made of about 5 percent of silicate—the remainder is air. Aerogel was used already in the sixties for insulation of space suits and it has as many as 15 entries in the *Guinness Book of Records*, including entries for "the best insulator" and "the lightest solid." In construction, aerogel is already being used for instance as insulation material which can be blown into wall spacers, or used in the form of insulation boards made of nonwoven fabric. Aerogel beads are indeed extremely light, almost weightless, and they can be held between the thumb and forefinger. But as soon as you rub your fingers, they crumble. After two or three movements, only fine powder will remain. Good results can be achieved when the powder is gently stirred with water and the resulting plaster is applied manually. However, when the plaster is pumped at a pressure of 7 to 8 bars through the hose of a professional plaster machine, the mechanical stress destroys the aerogel and its insulating effect. This means that aerogel would have to be integrated in such a way in the plaster so that its effect is maintained even with machine pumping of the insulating plaster. Laboratory samples of materials developed by the Swiss Material Testing Institute EMPA in Dubendorf, Switzerland, resulted in a thermal conductivity of $\lambda=30$ mW/mK. Therefore, aerogel insulating plaster should be more than twice as good as a conventional insulating plaster and it should have comparable or even better insulating properties than a board made of extruded polystyrene (EPS). Conventional insulating plasters have a lambda value between 65 and 90 mW/mk, the worst plasters have a lambda value of 110 or 130 mW/mK. For practical applications, aerogel insulating plaster is sprayed onto the masonry with a plaster machine and then smoothened. This soft insulating plaster must be then protected in another operation with a mortar containing embedded fabric. However, it has been shown that when aerogel is applied as a pumped plaster, significantly more heat passes through it, in particular when the pumping route to its application was long. Due to the mechanical stress on the aerogel in the pump, its effect is decreased and the lambda value is increased. With a pumping line that is 30 meters long, the heat transmission is increased and the lambda value is thus raised from 30 to 40 to 45 mW/mK.

Buildings are usually constructed for a lifetime of 50-70 years. The buildings are then often dismantled after this time period. Accordingly, it makes sense to build in a sustainable manner, which means that renewable or recyclable raw material should be used. The raw materials should be environmentally neutral and they should not have an EPS or polymer base, which must be disposed of in special landfills. This is because the high costs of the disposal results in high construction costs.

On the other hand, thermal insulation boards do not incur any damage as a result of their installation and there is no deterioration of their $\lambda$ value. An aerogel has a $\lambda$ value of 15 to 20 mW/mK, which means that it is a better value than that of an extruded polystyrene board (EPS board), which has a $\lambda$ value of 33 mW/mK. Although not all insulation boards can be used, such boards are still ideal in situations in which a low $\lambda$ value is required because they do offer a low $\lambda$ value. Aerogel boards or aerogel insulating plasters are generally very expensive. If it were possible to use an insulating plaster with comparable $\lambda$ values, this would be extremely interesting for many applications because the insulating plaster can be sprayed also onto angled locations of a structure with a simple spraying process.

With traditional lightweight materials, lightweight concrete or traditional plasters or mortars are already modified. These mortar mixtures, however, are often not suitable or they are expensive. Absorbent, strongly hygroscopic products tend to develop shrinkage cracks in the initial phase of the binding process. Lightweight construction materials made from EPS are not fire-resistant. They are the opposite of fire-resistant materials. These products supply additional energy (nourishment) for the fire and they thus speed up the spreading of the fire. Accordingly, additional fire prevention measures are in practice often required when EPS (Styrofoam) is used.

A completely different aspect relates to a finishing plaster. For finishing plasters are commonly used dispersion-based binders. A common formulation that has been used for such a dispersion-based finishing plaster up until now is as follows: approximately 90 volume percent consists of sands, preferably silica sands with different grains sizes, mixed to achieve an ideal screen size for dimensions from 0 to 5 mm. The sands have a density of approximately 1.9-2.2 kg/l. Approximately 10 volume percent is then represented by a water-based dispersion (glue). If necessary, an additive is also added, for example a foaming agent and/or other additives which can be added for homogenous drying or for temperature control. Such finishing plasters are usually supplied to carry out the plastering operation in 25 kg pressure vessels. These pressure vessels must be in a tall building moved several floors up, which is often done manually and thus correspondingly labor intensive. Depending on the type of the sand and whether it is more absorbent or less absorbent, a part of the dispersion will penetrate into the sand, which means that a large amount of the dispersion is required and that the system is therefore expensive. The sands absorb additional water and the finishing coat thus rapidly hardens. Accordingly, a large staff must be present at the construction site to make it possible to apply the finishing plaster homogeneously before it starts to harden. Otherwise, the transitions from one scaffolding to another scaffolding location are difficult to manage and this is then in many cases visible on the object.

SUMMARY OF THE INVENTION

In view of the situation described above, the object of the invention is to provide a mortar mixture which can be used for different purposes depending on the composition, in particular at least for the following purposes:
 for thermal insulation,
 for protection against fire in the form of a lower coat, reinforcement or finishing plaster,
 to create a screed coat for floor or floor finish,
 as a leveling mortar or repair mortar for horizontal applications,
 as a casting mortar in the form of a casting form in the construction industry,
wherein these mortar mixtures should be in comparison to conventional mortar mixtures significantly lighter, as well as have better thermal insulation and fire protection properties, while they should be inexpensive to manufacture and they should also enable easy handling for the application, in particular also because they can be also supplied dry and pumped when required. The mortar mixture should in addition also provide substantially higher compressive strength than conventional mortar mixtures which are based on open-cell perlite. The mortar mixture should not be hygroscopic, it should easily absorb water and accordingly provide also an optimal room climate.

Furthermore, another object of the invention is to provide a method for manufacturing such a mortar mixture in different specific compositions, in particular for an insulating plaster which is as light as possible, which has a λ value that is comparable to or lower than that of conventional insulation plasters, and which provides such a stability and durability that it is suitable for installation on interior and exterior walls of buildings, as well as for a finishing plaster, which has a substantially lower weight than conventional finishing plasters and which can be homogeneously applied in a simple and easy manner, can also provide protection from fire and can be used as floor screed, as leveling mortar and as repair mortar or as casting mortar.

In addition, it should be possible to manufacture this mortar mixture inexpensively in comparison to conventional insulating plasters and finishing plasters, so that in the case of an insulating plaster, the plaster is also economically competitive with established insulating procedures such as the application of customary insulating plasters. In the case of a finishing plaster, it should be significantly lighter and easier to handle than previously known finishing mortars.

Finally, an object of the invention is to provide the use of such mortar mixtures, whether these are insulating plasters used to achieve better thermal insulation of building envelopes, plasters that are used as reinforced plasters with embedded reinforcing nets and to provide protection against fire on an ESP or for Styrofoam boards, or as finishing plasters to achieve homogenous and easy-to-apply exterior plasters, whether in order to ensure sufficient protection from fire, or to create floor screed/floor finish plasters and to apply the plaster as a repair plaster or as an leveling plaster mixture. Finally, the invention also relates to a building structure in which similar mortar mixtures, such as insulating plasters, reinforced plasters and/or finishing plasters are processed for screed plasters or for fire protection, or applied as other construction elements, for example as casting mortar or as repair mortar and leveling mortar.

The mortar mixture should be also as light as possible, it should have a comparable or a lower λ value than that of comparable conventional screed mortars or insulating mortars, and it should be resistant to fire. In addition, the mortar mixture should have such strength and durability that it would be suitable for installation on interior and exterior walls, as well as on floors of building, and it should also be permeable to vapor. The mortar mixture should absorb only a small amount of water and it should have a substantially smaller weight than that of traditional mortar and thus be much simpler and easier to apply homogenously. If the mortar mixture is used as reprofiler mortar or as leveling mortar, or put as casting mortar in a formwork, it should also be provided with a high compressive strength.

In addition, it should be possible to manufacture the mortar mixture inexpensively in comparison to conventional plasters or reprofiler mortars or casting mortars, so that it would be also economically competitive with established methods. In the case of a dispersion-based finishing plaster, it should be substantially easier to handle than the finishing plasters that are known so far.

This object is achieved with a mortar mixture for thermal insulation and/or for protection from fire for an undercoat, reinforced or finishing plaster, for a floor finish or screed, used as a leveling or repair mortar for horizontal applications or as casting mortar for a casting form or mold form for building structures which are characterized in that relative to their volume they contain at least 20% of glazed, close-cell balls of expanded silica consisting of silica sands or expanded perlite having a compressive strength of 0.7-6.0 $N/mm^2$, and the remaining volume consists at least of a binder.

This mortal mixture for plasters or reprofiler mortars or for leveling or casting mortars is characterized in that the sands are partially replaced by glazed, close-cell balls filled with air which have a compression strength that is 3-20 times higher (based on the hydraulic test method) than that of traditional, fractured, open-cell perlites. In this case, at least 20% of the volume of the mortar mixture is replaced by the glazed, close-cell balls. The remaining volume consists of sands having different grain sizes, mixed with an ideal grain distribution curve, and of at least one binder.

A particular application of this thick-layer mortar mixture on a mineral base is represented by all types of reprofiling mortar or leveling mortar for covering horizontal surfaces. The additives are partially adjusted in such a way that the mortars are self-leveling. Such mortars with lightweight materials can be also poured into molds (light concrete). In all of these applications, however, it is not only the low density of the mortar or of the concrete mix that is important, but also a sufficiently high compressive strength, which results in resilient end products.

The method for manufacturing such a mortar mixture for thermal insulation and/or fire protection is characterized in that the perlite sand is first sorted according to different grain size, so that each grain size is then expanded in a trickle channel provided with multilevel temperature zones, wherein the surface is of the balls is thus glazed so that in the end, a homogenous mixture is manufactured with the addition of a binder from the glazed perlite, which is produced in this manner and which has one or multiple grains sizes. This homogenous mixture contains relative to its volume at least 20% of these glazed, closed-cell balls consisting of expanded silica sand or expanded perlite having a compressive strength of 0.7-6.0 $N/m^2$, and the rest of the volume contains at least one binder.

The use as an finishing plaster is characterized in that the finishing plaster is filled in the form of a pasty mass into tubs up to 10 kg of weight, which is made available on the construction site and applied there manually. This is possible because the density of the finishing plaster is as a result of the addition of a lightweight aggregate only about 25-50% of the density of a finishing plaster with sand aggregates.

The use of an insulating mixture as an insulating plaster for insulation of building envelopes for internal and external walls is characterized in that the insulating plaster is injected by means of a screw pump with a spiral pump, which is provided with a screw and with an elastically resilient pump cylinder, which is impacted outside of the screw area with air pressure or oil pressure, and which is accommodated in a pressure-resistant exterior pipe so that the mixture is injected via a hose through a nozzle with or without the addition of water and sprayed onto a wall to be insulated.

BRIEF DESCRIPTION OF THE DRAWING FIGURES

Figure 2:
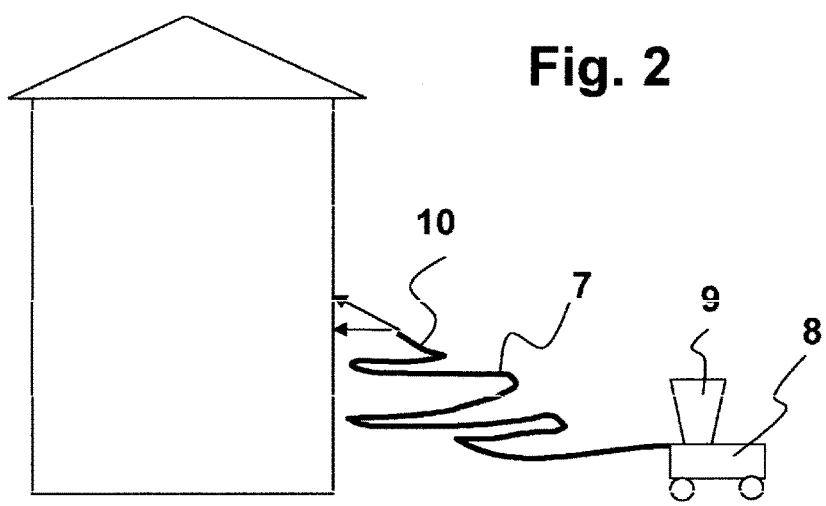

Referring now to the figures, the figures explain the gentle pumping process and the use of the perlite insulating plaster. In addition, the manufacturing of the perlite insulation plaster and its composition will be disclosed and its properties will be subsequently discussed. The application of the plaster mixture in a finishing plaster is carried out manually, wherein a major advantage is the fact that, first of all, this finishing plaster corresponds approximately to only one-fifth of the weight of a conventional finishing plaster applied to the same surface area; and secondly, since the dispersion is not absorbed by the expanded perlite, a homogenous application of the finishing plaster is greatly facilitated. The figures show the following:

FIG. 1: a schematic view of the construction of a screw pump for the application of a perlite insulating plaster;

FIG. 2: the application of a perlite insulating plaster onto an external wall by means of a perlite insulating plaster pump system.

DETAILED DESCRIPTION OF THE DRAWING FIGURES AND PREFERRED EMBODIMENTS

Raw perlite is a chemically and physically transformed volcanic rock (obsidian), which has a white, powdery appearance. The raw perlite contains up to 2% of water and it has a density of 900-1,000 kg/m$^3$. It is a natural building material, which is very suitable as expanded perlite for insulation and which is very light. The raw material is formed in seismically active zones and it is therefore naturally renewed and thus available over the long-term. The product can be easily recycled and it can be disposed of together with other mineral construction materials based on conventional building protection rules and possibly reused again. Traditional perlite, which is expanded by inflating in the conventional process, is open-celled, it has a low compressive strength and correspondingly it is not suitable as an addition to mortar on which high requirements are made. In multi-step annealing using rising temperatures of up to 800° C. to 1,000° C., it is possible to expand perlite's volume 10-15 times. The density of the expanded product is then only 80-400 kg/m$^3$. The expanded perlite also has an exceptionally light weight. The expansion of perlite through air blowing has been known for years. However, the air-blowing method used up until now leads to open-cell, fractured perlite. In contrast, at the core of the present insulating board is the fact that a novel type of perlite is used, which consists of glazed balls having closed cavities. The process for manufacturing these novel perlites is carried out in several stages in a gravity oven provided with several temperature zones. Each individual grain size is then exposed to several temperature zones in a trickle channel which has increasing temperatures. Here, the perlite grains are extended by being filled with blown air so that the surface of the balls is glazed. The particles that are usually produced in this manner have for example the following ball diameters:

0.1 mm to 0.5 mm
0.5 mm to 0.8 mm
0.8 mm to 1.0 mm
1.0 mm to 2.0 mm

As opposed to fractured perlite, these novel glazed balls have a very low water absorption capacity. In order to improve open-cell perlites with respect to their water absorption capacity, the perlites were, up until now, coated, for example with bitumen. Another variant is to impregnate open-cell perlites with paraffin or to refine them with silicon and use them as fillers. However, the perlites processed in this manner are not very suitable for use as insulating plasters because the compressive strength of these products is as small as before the processing and corresponds only to approximately 0.2 N/mm$^2$.

Such closed balls are created as mentioned above by expanding silica sand or with the perlite air blowing treatment. These balls, which have different diameters, are characterized by a specific gravity of only 80-400 kg/m$^3$. They are therefore extremely light as well as extremely heat-insulating, with a $\lambda$ value of 20 to 35 mW/mK, and as they also have a high compressive strength of 0.8-6.0 N/mm$^2$, they are suitable for the manufacturing of a perlite-based insulating plaster. This takes into account in terms of the volume 75% to 90% of such glazed balls, which are therefore provided with a closed surface, air-filled balls from expanded silica sand or air-filled perlite containing binders, additives, an air entrapment agent and/or other chemical additives which are homogenously mixed. A particularly advantageous mixture has the following composition:

450±25 liters of glazed, expanded perlite with a grain size of 0.1 mm to 0.5 mm
450±25 liters of glazed, expanded perlite with a grain size of 0.5 mm to 0.8 mm
120±20 kg of Portland cement used as a binder
80±20 kg of hydraulic lime used as a softening binder
20 grams of cellulose used as an additive
20-60 grams of an air-void forming agent.
chemical additives such as plasticizers, fast binders, polymers and/or other additives. A similar insulating plaster for insulating building envelopes weight depending on the specific composition only about 260 to 350 kg/m$^3$, and it provides after pumping for over 20 meters (!) a $\lambda$ value of 40-50 mW/mK.

Another formula for such a mortar mixture may be as follows:

| | |
|---|---|
| 8-22 volume % | mineral binders, such as reactive additives based on cement, lime or on a volcanic basis, |
| >20 volume % | glazed, closed-cell balls with a high compressive strength of 0.7-5.0 N/mm$^2$ |
| 58-72 volume % | sands with an ideal screen size or/and special supplements |
| 50-300 g | mineral additions such as cellulose or/and other additions |
| 20-100 g | air-void forming agents or foaming agents |
| small amounts | chemical additions such as plasticizers, polymers and other additions |
| 100% volume | Total |

With this formula, the amount of the closed-cell balls is smaller because the sands are only partially replaced. The insulating effect is also correspondingly smaller.

The pumping of traditional perlites or aerogels is a delicate process. When the plaster is pumped with a pressure of 5 to 20 bars through the hose of a professional plaster machine, the mechanical stress destroys traditional perlite or aerogel in the insulating plaster. To prevent that from happening also with the present mortar mixture having glazed, close-cell balls and to make sure that its excellent $\lambda$ value will be preserved as much as possible, the mortar must be supplied and applied with a special screw pump. This screw pump, which is schematically illustrated in FIG. 1, is equipped with a special pump cylinder 3, in which the screw 1 is rotating about the axis 6. The pump cylinder 3 is covered by a further pressure-resistant pipe 4. The intermediate space 5 between the pump cylinder 3 and the exterior pipe 4 can be regulated by being impacted with air pressure or oil pressure. This makes it possible to achieve that elastic soft wall of the pump cylinder 3 conforms in the area of the screw 1 to the exterior edges of the windings of the screw 1 and projects the cylinder wall with a curved from into the interior part of the pump cylinder 3, which is to say that it is slightly curved between the windings of the turning screw 1. The perlite thus cannot be crushed on the exterior edges of the screw windings, as the cylinder wall 3 will yield elastically beforehand. By and large, the perlite insulating plaster is thus conveyed very gently in this manner, so that only a minimal reduction is obtained even after pumping over a distance of 20 meters and its thermal insulation properties will be reduced only minimally.

FIG. 2 illustrates how this mortar mixture is applied for thermal insulation and/or for protection from fire. The wall to be coated is prepared ahead of time for the application of the plaster. After that, the mortar mixture, or the special insulation plaster is poured through a funnel 9 into a pump carriage 8 in which pumping operations are carried out with a soft and elastic, flexible pump cylinder 3 which is impacted by external pressure. The insulating plaster is pumped by the pump carriage 8 while water is added with an ideal ratio so that it adheres to the wall to be provided with insulation. The pressures are then exerted up to 8 bars and pumping distances of up to 20 m or more can be overcome without a significant deterioration of the insulating plaster. The applied insulating plaster is water permeable and it has a $\lambda$ value of approximately 40 to 50 mW/mK. This means that a much less strong insulating plaster layer needs to be sprayed on than usual. In addition to that, this insulating plaster is clearly less expensive to manufacture than for example airgel insulating plaster. This insulating plaster can be also used for embedding of a reinforcement made for example of glass. Such a reinforcing plaster is in practice applied to old, cracked plasters or to EPS-based insulating plates. The coated wall that has been treated in this manner may then be covered with a dispersion-based finishing coat or with an open-pore silicate paint and although the layer structure remains permeable to vapor, it is thermally insulating.

An embodiment for carrying out the mortar as a mortar mixture for manufacturing and for applying a finishing mortar will be explained next: 75-95 volume percent of expanded closed-cell perlite having an expanded grain diameter of 0.2 to 2 mm was mixed with support grains, preferably consisting of silicate sand with a diameter of 0-5 mm. The dispersion and other additions formed the remaining volume of the mixture. The additional support grains are important so that the closed-cell perlites are not destroyed during the grating of the surface of the dispersion plaster and so that accordingly, a desired surface structure can be built with visible, large grains. Thanks to the extremely low weight of the expanded perlite, the density of the finished product, which is to say, the finishing plaster in the container that is ready for application, corresponds only to approximately 30% of a conventional dispersion plaster consisting of sands. A container with the same volume is thus 3-4 times lighter! Instead of a container that weighs 25 kg, only 5-9 kg thus must be transported on the construction site. An important advantage is also that this light finishing plaster material can be applied manually with much less effort. The plasterer/bricklayer now has only 30% of the weight on the trowel and the wiping is thus much simpler and less stressful. The light dispersion plaster adheres better to the wall and remains there. This also means that thicker layers can be applied. Heavy, conventional finishing mortar often tends to fall off, which is avoided with this novel finishing plaster. Yet another advantage is that the expanded closed-cell perlites are not strongly hydroscopic and therefore do not draw any dispersion or water components from the mixture. Therefore, this makes it possible to save on the dispersion, which is generally expensive. Since no water will be drawn off, the material can remain open longer and therefore can be also processed for a longer period of time.

The invention claimed is:

1. A mortar mixture for internal and external reinforcement and finishing plaster of building envelopes, comprising:
   glazed, closed-cell balls selected from the group consisting of expanded silica, expanded perlite and a combination thereof, having a compressive strength of 0.7-5.0 N/mm$^2$ and support grains filling at least 20% of a volume; and,
   a binder formed as an aqueous polymer dispersion filing at least a portion of a remaining volume of said volume, thereby yielding a reinforcing and finishing plaster in a pasty form, wherein the reinforcing and finishing plaster has a composition based upon a volume of 1,000 liters of:
   400±50 liters of glazed, extended perlite having a grain size of 0.1 mm to 0.5 mm;
   400±50 liters of glazed, extended perlite having a grain size of 0.5 mm to 0.8 mm;
   120±25 kg of Portland cement as a binder;
   80±25 kg of hydraulic lime as a softening binder;
   200 g of cellulose as an additive;
   20-60 g of air-voids forming agent; and,
   the remaining volume comprising a chemical additive selected from the group consisting of a plasticizer, a quick binder, a polymer support grains and a combination thereof.

2. The mortar mixture for internal and external reinforcement and finishing plaster of building envelopes according to claim 1, wherein said glazed, closed-cell balls has a grain size of 0.2 to 2 mm and the support grains have a grain size of up to, and including, 5 mm, and with the reinforcing and finishing plaster having a density of 0.1-0.4 kg/l.

3. The mortar mixture for internal and external reinforcement and finishing plaster of building envelopes according to claim 1, wherein said reinforcing and finishing plaster has a density of less than 1,000 kg/m$^3$.

4. The mortar mixture for internal and external reinforcement and finishing plaster of building envelopes according to claim 3, wherein said reinforcing and finishing plaster has a $\lambda$ value of 40-60 mW/mK.

5. A method for preparing a mortar mixture, comprising:
   glazed, closed-cell balls selected from the group consisting of expanded silica, expanded perlite and a combination thereof, having a compressive strength of 0.7-5.0 N/mm$^2$ and support grains filling at least 20% of a volume; and,
   a binder formed as an aqueous polymer dispersion filing at least a portion of a remaining volume of said volume, thereby yielding a reinforcing and finishing plaster in a pasty form,
said method comprising the steps of:
   sorting perlite support grains by particle size distribution in a trickle channel;
   glazing the perlite support grains in multi-stage temperature zones for creating said glazed, closed-cell balls;
   preparing a homogeneous mixture of said glazed, closed-cell balls with one or more grain sizes, the homogeneous mixture of said glazed, closed-cell balls comprising a volume of 20% or more of said mortar mixture and having a compression strength of 0.7 to 5.0 Nmm$^2$;
   adding cellulose;
   adding an air-voids foaming agent;
   adding a binder; and,
   creating a homogenous mixture for yielding a reinforcing or finishing plaster for use as a mortar mixture.

6. The method for preparing a mortar mixture according to claim 5, wherein said glazed, closed-cell balls have grain sizes between 0.1 mm to 2.0 mm and is homogeneously mixed with:
- 120±25 kg of Portland cement as a binder;
- 80±25 kg of hydraulic lime as a softening binder;
- 200 g of cellulose as an additive;
- 20-60 g of air-voids forming agent; and,
- the remaining volume comprising a chemical additive selected from the group consisting of a plasticizer, a quick binder, a polymer support grains and a combination thereof, wherein the reinforcing and finishing plaster has a composition based upon a volume of 1,000 liters.

7. The method for preparing a mortar mixture according to claim 5, wherein said glazed, closed-cell balls have grain sizes between 0.1 mm to 2.0 mm and is homogeneously mixed with an aqueous polymer dispersion as the binder.

8. The method for preparing a mortar mixture according to claim 5, wherein said glazed, closed-cell balls have grain sizes between 0.1 mm to 2.0 mm and is homogeneously mixed with:
- 30%-60% with a diameter of 0.1 mm to 0.5 mm;
- 20%-50% with a diameter of 0.5 mm to 0.8 mm;
- 10%-30% with a diameter of 0.8 mm to 1.0 mm;
- 0%-10% with a diameter of 1.00 mm to 2.00 mm, said glazed, closed-cell balls being homogeneously mixed with:
- 120±25 kg of Portland cement as a binder;
- 80±25 kg of hydraulic lime as a softening binder;
- 200 g of cellulose as an additive;
- 20-60 g of air-voids forming agent; and,
- the remaining volume comprising a chemical additive selected from the group consisting of a plasticizer, a quick binder, a polymer support grains and a combination thereof, wherein the reinforcing and finishing plaster has a composition based upon a volume of 1,000 liters.

9. A building structure, comprising:
a wall or floor structure coated with a mortar mixture containing glazed, closed-cell balls with a compressive strength of 0.7-5.0 N/mm$^2$, wherein said glazed, closed-cell balls comprises at least 20% by volume of said mortar mixture.

* * * * *